(12) United States Patent
Sitzler et al.

(10) Patent No.: US 7,017,965 B2
(45) Date of Patent: Mar. 28, 2006

(54) MOTOR-VEHICLE CARGO NET

(75) Inventors: Wolfgang Sitzler, Wuppertal (DE);
Jürgen Salewski, Dusseldorf (DE)

(73) Assignee: BOS GmbH & Co. KG, Ostfildern (DE)

( * ) Notice: Subject to any disclaimer, the term of this patent is extended or adjusted under 35 U.S.C. 154(b) by 288 days.

(21) Appl. No.: 10/636,485

(22) Filed: Aug. 7, 2003

(65) Prior Publication Data

US 2005/0151387 A1   Jul. 14, 2005

(51) Int. Cl.
   *B60R 21/06*  (2006.01)
(52) U.S. Cl. .............................. 296/24.43; 296/37.16; 280/749; 160/265
(58) Field of Classification Search .............. 296/24.4, 296/24.43, 37.1, 37.7, 37.8; 280/749; 160/370.22, 160/265; 410/134, 137, 139; 292/210, 216, 292/217, 200, 100, 102
See application file for complete search history.

(56) References Cited

U.S. PATENT DOCUMENTS

| | | | |
|---|---|---|---|
| 6,183,028 B1 * | 2/2001 | Ament et al. ............ | 296/24.43 |
| 6,325,436 B1 * | 12/2001 | Ehrenberger et al. ...... | 296/24.4 |
| 6,349,986 B1 * | 2/2002 | Seel et al. ................ | 296/37.16 |
| 6,390,526 B1 | 5/2002 | Ament | |
| 6,592,165 B1 * | 7/2003 | Ament et al. ............. | 296/37.16 |
| 6,595,567 B1 * | 7/2003 | Ament et al. ............. | 296/24.43 |
| 2002/0113452 A1 * | 8/2002 | Ament et al. ............. | 296/37.16 |
| 2002/0163220 A1 * | 11/2002 | Ament et al. ............. | 296/37.16 |

FOREIGN PATENT DOCUMENTS

| | | |
|---|---|---|
| DE | 196 50 768 | 6/1998 |
| DE | 197 48 595 | 5/1999 |
| DE | 199 49 417 | 9/2000 |

* cited by examiner

*Primary Examiner*—Patricia L. Engle
(74) *Attorney, Agent, or Firm*—Herbert Dubno; Andrew Wilford

(57) ABSTRACT

A motor vehicle has a safety apparatus having an extensible safety net having an outer edge, a rigid end element provided on the outer edge and having a fitting, and a holder on the motor-vehicle body having a seat in which the fitting is engageable when the net is deployed. A latch element is movable in the holder between a holding position extending into the seat and retaining the fitting therein in the deployed condition of the net and a freeing position clear of the seat and permitting the fitting to move into and out of the seat. This latch element has a control edge operable to displace the latch element into the freeing position. An actuator on the end element is engageable with the fitting when the fitting is retained by the latch element in the seat and can displace the latch element into the freeing position.

13 Claims, 3 Drawing Sheets

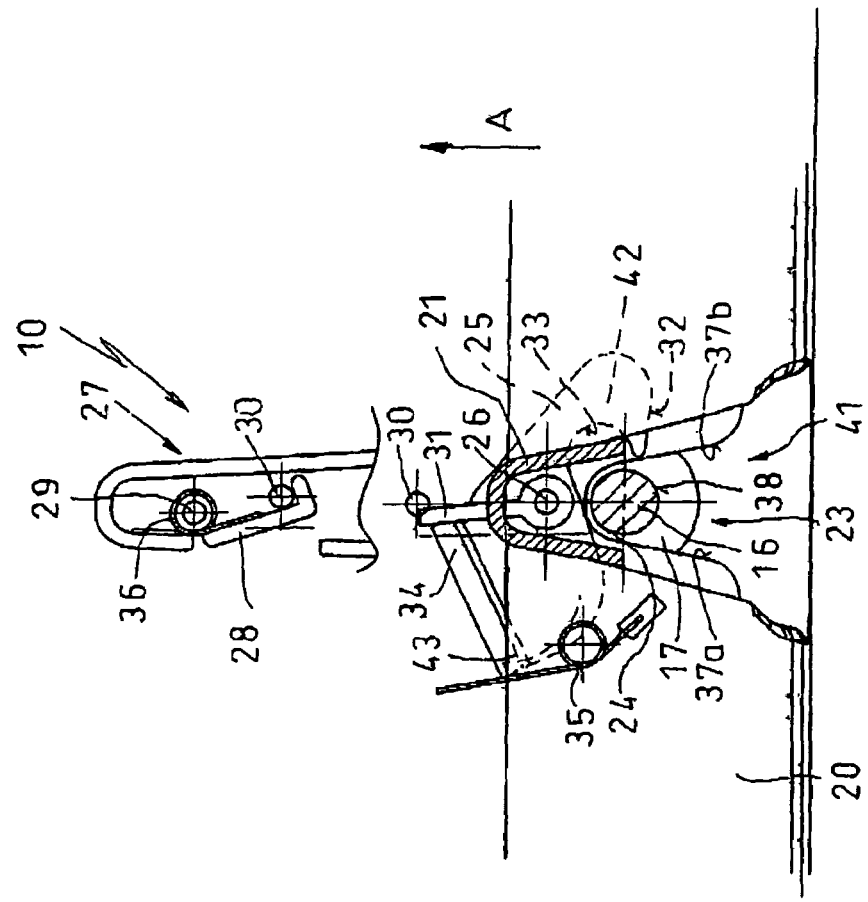
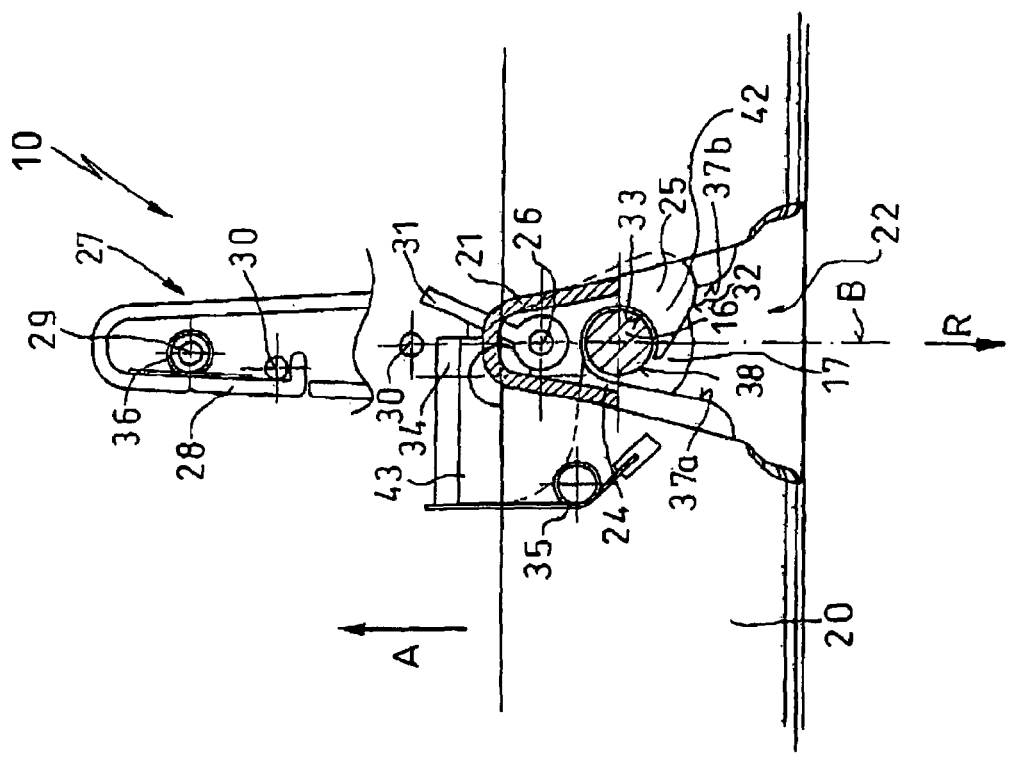

MOTOR-VEHICLE CARGO NET

FIELD OF THE INVENTION

The invention relates to a motor-vehicle safety apparatus, in particular to a safety net for separating a cargo space from a passenger compartment.

BACKGROUND OF THE INVENTION

Normally a motor-vehicle safety apparatus has a roller housing at the rear of the rear-seat back of a motor vehicle. A safety apparatus constituted as a safety net can be pulled out into a vertical position so that it extends upward from the upper edge of the rear seat back and closes the space up to the vehicle roof.

In this manner, if for example the vehicle is braked suddenly, any objects in the cargo space are prevented from being projected from the cargo space into the passenger compartment.

In order to secure a holder rod mounted at the free end of the safety net, the rod ends are normally hung in seats on the sides of the motor vehicle. It is fairly difficult to engage the fittings at the ends into, for instance, keyhole-shaped mounts. Since the user is normally well forward and bent over when doing this maneuver and the pulled-out net is under some tension by a spring drive, such a job is so uncomfortable and laborious that one often dispenses with the safety net altogether, leading to a dangerous situation for the passengers.

German 196 50 768 describes a safety system where a latch device is provided that prevents the safety net, once unwound, from winding back up again on the shaft. The user thus does not have to deal with the return force of the spring drive on the rod and can more easily fit it to the hanger seats.

Another principle is pursued by the applicant in a holding and releasing system according to German 199 49 417. Here rod ends are secured in sockets by a releasable push-type connector. In addition there is a flared seat whose floor has a latch element with which a complementary latch element of the rod end can interact. The rod end is provided with a retaining element which is movable on the rod end and urged into a latched position by a spring.

OBJECT OF THE INVENTION

An object of the invention is to improve on the safety apparatus of German 199 49 417 generally in that maximum safety is achieved with simpler construction and easier use.

SUMMARY OF THE INVENTION

The invention achieves this object generally with a motor-vehicle safety apparatus, in particular a safety net for separating a cargo space from a passenger compartment, having a material web unwindable from a winding shaft and having a free end provided for example with an end element formed as a holding rod with an end fitting for securing in a seat notch on the vehicle body. The seat notch has an outer part for the end fitting that leads to a seat and that can be at least partially blocked by a latch element movable between a blocking position and a freeing position. The latch element projects in the blocking position into a path of the end fitting and has a control edge for the end fitting. The end element has an actuator for displacing the latch element into the freeing position.

The principle of the invention is generally that the outer part of the seat notch is closable at least partially by a latch element movable between a holding position and a freeing position. The latch element is provided at the seat notch and extends into the movement path of the end fitting. In this manner, with the latch element at the seat notch, the assembly can be very simple and the outer part for the end fitting can be closed such that it is held in a seat for the end fitting, in particular by being trapped. In this manner relatively large surface regions of the latch element and end fitting are engaged with each other. The latch element can be particularly strong, in particular very rigid, so that the end element is held in the vehicle-body seat notch even in a collision.

In addition the invention proposes the possibility of using with known elements, for example a holder rod with mushroom-shaped ends that form the end fittings. This makes inexpensive manufacture and easy assembly possible.

In contrast to the motor-vehicle safety apparatus of German 199 49 417, there is no plug-socket connection provided that is connected to the holder rod. The latch elements of the known motor-vehicle safety apparatus are inside a tubular holder rod and must be made very small and the seat notch must also be made very small. As a result only one plug element can be provided in the holding seat notch at its base or elsewhere.

The solution according to the invention uses a latch element which can block the entire width of the seat notch for the end fitting so that the latch element can be relatively large. As a result of the large dimensions of the retaining surfaces of the latch element and the end fitting it is possible to make the assembly very collision resistant.

In addition the solution according to the invention offers the possibility of providing the latch element with an actuating part that a release element can engage. When the parts—in particular the latch element—are large enough, manufacturing tolerances need not be close. This offers considerable advantages both with respect to the manufacture and assembly of the motor-vehicle safety apparatus according to the invention. In particular the solution according to the invention offers the advantages of less sensitivity to tolerances in the seat notch which is particularly important in the construction of a motor vehicle. The end fittings can be made as is standard fairly small since the retaining surfaces engaging the end fittings and that actually trap then engage the end fittings from outside. The outer surfaces offer a larger surface area than the prior art where internal surfaces are used.

In addition further according to the invention the latch element has a control edge for the end fitting, so that when the safety net is deployed they automatically snap together.

The control edge for the end fitting thus makes it possible, in particular when combined with a seat notch when deploying the safety net, to have automatic latching without the user having to painstakingly fit things together. The seat notch can be outwardly flared so that centering is automatic and the end fitting is guided into the seat. The deploying procedure is substantially eased for the user.

The latch element which is substantially bigger than in the prior art can also have particularly simple control edges for the end fitting.

Finally the inventive solution makes it possible to simply provide an actuator which can be arranged in the center of the end element and still move both of the latch elements at the two ends into their freeing positions.

According to the invention the latch element is rigid and very strong. It can be spring-loaded into its holding position and the invention proposes advantages systems for the spring. Thus the spring can contact particular parts of the latch element. These parts can be made relatively easily because of the large size of the latch element. Mounting the latch element on the motor vehicle makes it particularly simple to provide space for the spring biasers.

According to a further feature of the invention the end element has a grip in particular a handle. This makes it possible for the deployment movement to be particularly comfortable since the user is offered a particularly easy way to hold the part. Finally this also makes it possible to provide the actuator near the handle so that manipulation is even simpler.

According to a further preferred feature of the invention the actuator is provided immediately adjacent the grip. This construction makes it possible that simply by grabbing the handle the actuator is operated. In particular the actuator can be part of the handle and be for example immediately next to a grip, that is next to the hand hole. In order to move the latch elements into their freeing positions the user comfortably grabs the handle and thereby operates the actuator. Without releasing the handle the end element is held and can subsequently be dropped to wind up the safety net.

According to a further feature of the invention the latch element is pivotal. This makes a particularly simple construction of the latch element possible, in particular as a claw. In addition such a simple construction and the availability of large holding surfaces are made possible so that the assembly is very strong. Finally the pivotal latch element has the advantage of particularly easy actuation by the release element.

According to a further preferred feature of the invention the latch element engages with an inside surface an outside surface of the preferably mushroom-shaped end fitting. This facilitates a particularly strong assembly of simple construction.

BRIEF DESCRIPTION OF THE DRAWING

Further advantages are seen in the the following description of an embodiment shown in the drawing. Therein:

FIG. 3 schematically shows in partial section the end element and the socket mounted together according to section line III—III of FIG. 1; and FIG. 4 is a view like FIG. 3 of the motor-vehicle safety apparatus according to the invention with its latch claw pivoted into the release position.

SPECIFIC DESCRIPTION

Figure 1:
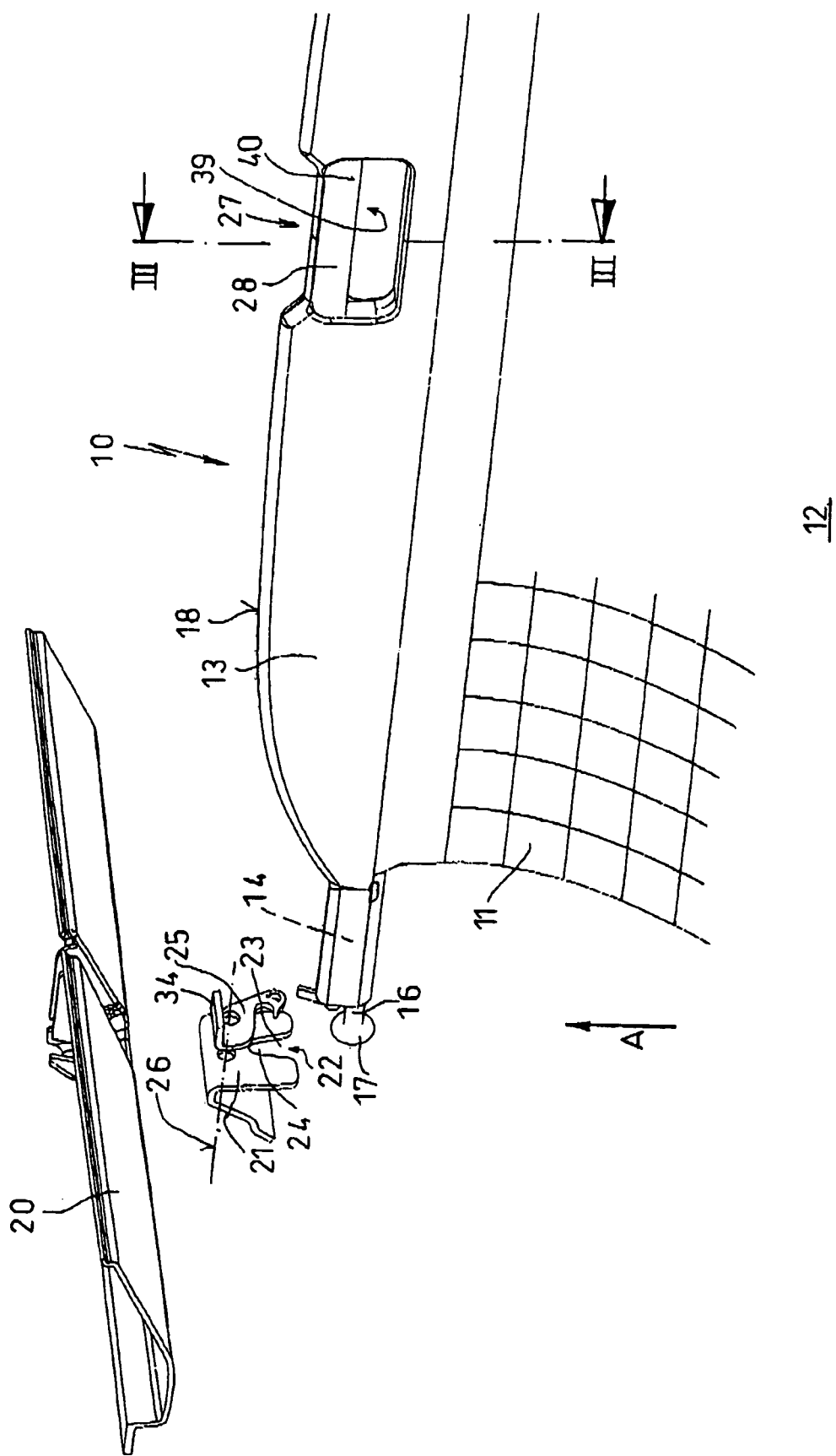
FIG. 1 shows schematically in an exploded partly broken-away view the left upper corner of a motor-vehicle safety net and its end element, a portion of the inside of the vehicle body, and a holder with a seat.

The motor-vehicle safety apparatus 10 shown in the drawing is only partially illustrated. It comprises a net 11 formed with holes and wound on an unillustrated winding rod that is for example provided in a roller housing that is secured on a seat back. The winding rod is thus located below the region shown at 12 and can be pulled out in a deploy direction A from the roller housing.

At the upper free end of the net 11 shown in FIG. 1 there is an end element 13. In the illustrated embodiment it has a support rod 14 that is engaged by a board 15 that forms with it the end element 13. The support rod 14 has at each of its axially opposite ends a mounting fitting 16 that in the illustrated embodiment each have a mushroom-shaped end 17. FIG. 1 shows only the left end of the end element 13.

The board 15 has a shaped edge 18 that fits to the curve of the unillustrated vehicle roof shown generally at 19. The axial length of the end element 13 corresponds generally to the vehicle width so that the opening between the roof 19 and an unillustrated seat back of the motor vehicle is nearly fully closed.

The end element 13 is provided with a handle 27 that is formed by a hand hole 39 and a grip 40. The user can thus comfortably grab the handle 27 to pull out the material web 11.

Near the unillustrated vehicle roof 19 and/or near each of the vehicle sides is a cover 20 that is formed of stiff sheet material. The cover 20 is fixed to or part of the vehicle body. The side cover 20 carries a holder 21 that forms a seat notch 22. The seat notch 22 is an outwardly flared opening as shown in FIGS. 3 and 4. It has an entry part 23 and ends at a seat 24 for the mounting fitting 16. The entry part 23 according to FIG. 4 is part of the seat notch 22 that is between the seat 24 and a mouth 41 of the seat notch 22. The seat notch 22 in this embodiment is provided with a latch claw 25. The latch claw 25 is pivotal at an axis 26 on the holder 21 and thus on the cover 20. The latch claw 25 has a hook 42 and an actuating arm whose operation is described below.

FIG. 3 shows the latch claw 25 in its holding position. Movement of the mounting fitting 16 or of the end element 13 from the seat 24 in the direction of arrow R, that is toward the roller housing, is impossible in this condition. The latch claw 25 reaches around the mounting fitting 16 such that its holding surface 33 engages an outer surface 38 of the mounting fitting. As a result of the shape, in particular the concavity, of the holding surface 33 and the orientation of the pivot axis 26 of the latch claw, the mounting fitting 16 is trapped by the latch claw 25.

The following first describes how the position shown in FIG. 3 is reached when the safety net 11 is deployed. To this end one starts in a position in which the mounting fitting 16 as shown in FIG. 3 is below the seat notch 22 and is moved into the seat notch 22 generally in the direction A.

The centering faces 37a and 37b of the seat notch 22 ensure that the mounting fitting 16 moves along a generally straight path (shown dot-dash) into the seat notch 22. The centering faces 37a and 37b can be centering faces that directly coact with the mounting fitting 16. It is also possible for the centering faces 37a and 37b to engage the mushroom-shaped-thickened end 17 or another part of the board element 13.

As the mounting fitting 16 moves, it engages a control edge 32 of the latch claw 25. The control edge 32 is inclined to the movement path B and extends into the movement path B so that further movement of the mounting fitting 16 in the direction A pivots the latch claw 25 counterclockwise about the pivot axis 26 so that the claw-like end 42 is moved out of the seat notch 22. The movement path B of the mounting fitting is thus clear so that the mounting fitting can pass freely into the seat 24 and thereby free the latch claw 25 as shown in FIG. 4.

A spring 35 on the vehicle body bears as shown in FIGS. 3 and 4 via a long upper leg on a part 43 of the latch claw 25 to urge it back into its holding position according to FIG. 3, thereby pivoting it clockwise about its pivot axis 26. Finally the FIG. 3 position is reached. The spring 35 serves to retain the latch claw 25 in its holding position so that the safety net 11 is arrested in its tensioned position.

Figure 2:
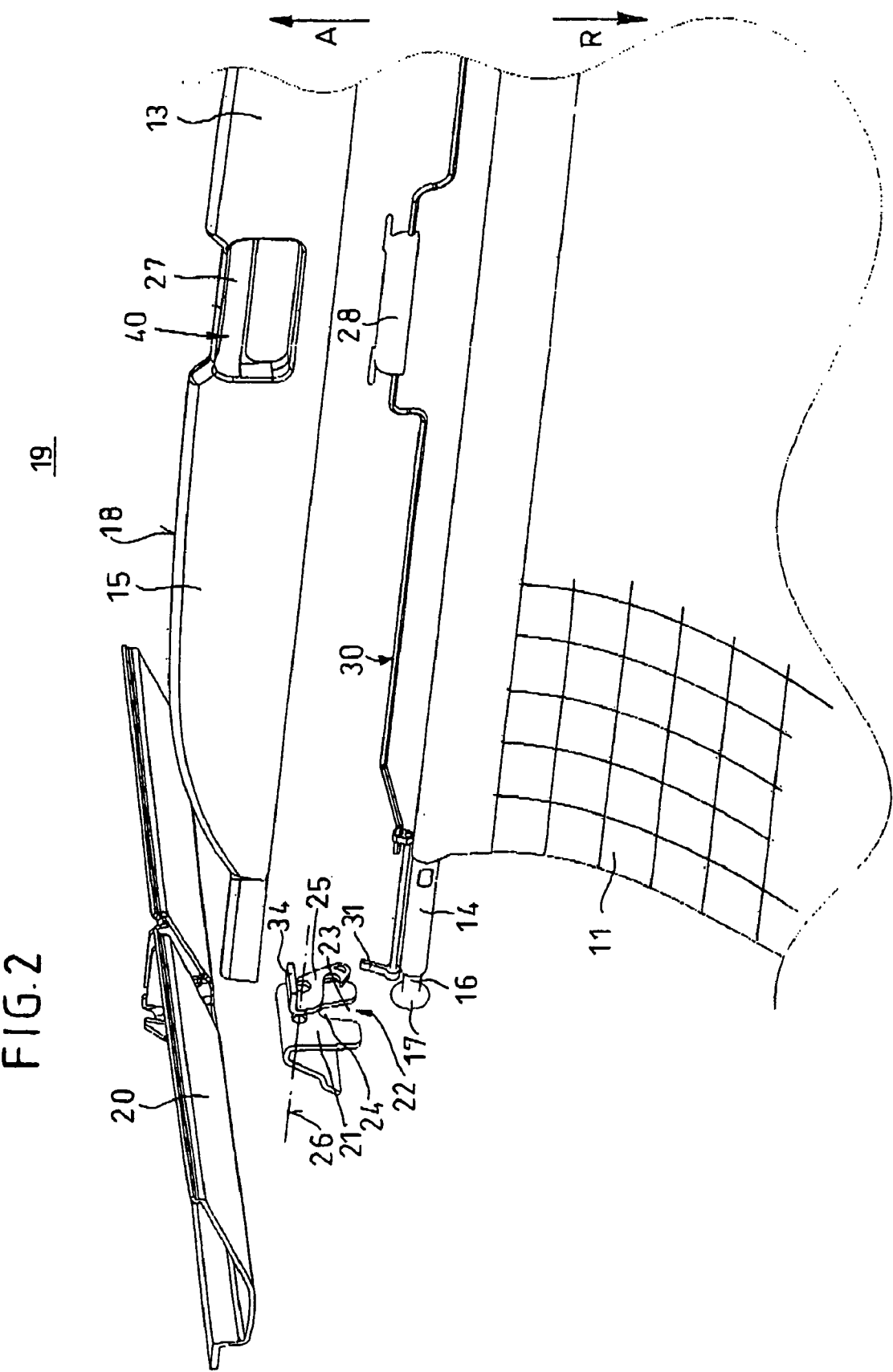
FIG. 2 shows the system of FIG. 1 with a separate end board and a transmission rod from an actuator to a release element.

In the following the unlocking mechanics of the latch claw 25 are described:

FIG. 2 shows how an actuator 28 is mounted on the end element 13. The actuator 28 is pivotal about an axis 29 (FIG. 4) and is pushed continuously by a spring 36 into the FIG. 3 rest position. FIG. 1 clearly shows how the actuator 28 is immediately adjacent the handle 27 so that it makes for a very comfortable operation of the actuator 28.

According to FIG. 2 the actuator 28 is connected via a rod 30 with a release element 31. The release element 31 is formed as a lever pivotal about an axis 26 and coacting with an actuating arm 34 of the latch claw 25. In this embodiment the pivot axis of the release element 31 is the same as the pivot axis 26 of the latch claw 25 which has particular advantages with respect to simple construction.

FIG. 3 shows the latch claw 25 in its holding position in which it traps the mounting fitting 16. The release element 31 is spaced from the mounting projection.

If now the user moves the actuator 28 counterclockwise from its FIG. 3 position about the axis 29 into the position of FIG. 4, as a result of the rod 30 this movement is transmitted to the release element 31. The release element 31 bears with the actuating arm 34 against the latch claw 25 such that counterclockwise pivoting of the release element 31 about the axis 26 also pivots the latch claw 25 counterclockwise about the axis 26. In this manner the release element 31 can pivot the latch claw 25 into the FIG. 4 freeing position so that the mounting fitting 16 is freed.

In order to hook the safety net 11 in the motor-vehicle seat notch 22 a user must grip the end element 13 at the handle 27 and pull the net 11 in the deploy direction A until the seat notch 22 is reached. During the upward movement as a result of the above-described snap action the mounting fitting 16 of the end element 13 is automatically trapped in the seat 24. The net 11 is in this manner safely and permanently arrested in its extended position.

In order to release the latch claw 25 the user again grips the handle 27 and operates the actuator 28. This pivots the latch claw 25 into its freeing position so that the mounting fitting 16 can move out of the seat notch 22. Since the user is holding the grip 40 of the handle 27, the end element 13 can be moved in the roll-up direction R of the net 11 to wind up on the shaft so that the net 11 is retracted. Thus a single hand can engage the grip 40 of the end element 13 and release the latch claws 25 at both ends of the end element 13 to pivot them into their freeing positions and then guide the end element 13 back down. Manual actuation is as simple and uncomplicated for lowering as for raising the net 11.

Since the outer sides 38 of the mounting fittings 16 are surrounded by the latch claws 25, fairly large holding surfaces 33 to 38 are in action. The arrangement can therefore be made very crash-resistant, that is the forces that are necessary to forcibly pull the end elements 13 out of the FIG. 3 holding position are greater than forces normally encountered in a motor-vehicle accident.

In addition the safety device 10 according to the invention is of particularly simple construction and assembly so that it can be manufactured at low cost.

The invention claimed is:

1. In a motor vehicle having a body with a cargo space and a passenger compartment, a safety apparatus comprising:
   an extensible safety net having an outer edge;
   a rigid end element provided on the outer edge and having a fitting;
   a holder on the motor-vehicle body having a seat in which the fitting is engageable in a deployed condition of the net between the cargo space and passenger compartment;
   a latch element movable in the holder between a holding position extending into the seat and retaining the fitting therein in the deployed condition of the net and a freeing position clear of the seat and permitting the fitting to move into and out of the seat, the latch element having a control edge operable to displace the latch element into the freeing position; and
   actuator means on the end element, engageable with the fitting when the fitting is retained by the latch element in the seat, and operable for displacing the latch element into the freeing position.

2. The motor-vehicle safety apparatus defined in claim 1 wherein the end element is elongated and is provided with one fitting at each end, the vehicle body having two respective holders with respective latch elements for the fittings.

3. The motor-vehicle safety apparatus defined in claim 2 wherein the actuator means is engageable with both of the latch elements.

4. The motor-vehicle safety apparatus defined in claim 3 wherein the actuator includes a single operating part located generally centrally between the ends of the end element.

5. The motor-vehicle safety apparatus defined in claim 4 wherein the end element has a central handle and the actuator includes a release element exposed and operable at the handle.

6. The motor-vehicle safety apparatus defined in claim 1 wherein the actuator means includes a release element exposed adjacent the fitting.

7. The motor-vehicle safety apparatus defined in claim 6 wherein the release element is pivotal on the end element.

8. The motor-vehicle safety apparatus defined in claim 7, further comprising
   spring means urging the latch element into the holding position.

9. The motor-vehicle safety apparatus defined in claim 1 wherein the seat is an outwardly flared and downwardly directed notch.

10. The motor-vehicle safety apparatus defined in claim 1 wherein the fitting is mushroom-shaped.

11. The motor-vehicle safety apparatus defined in claim 1 wherein the latch element is a hook-shaped claw.

12. The motor-vehicle safety apparatus defined in claim 11 wherein the claw has a concave inner surface and the fitting has a generally complementary convex outer surface engaging the inner surface when the fitting is engaged in the seat.

13. The motor-vehicle safety apparatus defined in claim 1 wherein the control edge is in the holding position of the latch element inclined at an acute angle to a centerline of the seat.

* * * * *